United States Patent [19]

Kassin, deceased et al.

[11] Patent Number: 4,742,193
[45] Date of Patent: May 3, 1988

[54] RETAINING DEVICE FOR HYDRAULIC MASTER CYLINDER SWITCH

[75] Inventors: Charles A. Kassin, deceased, late of Utica, by Marina Kassin, executrix; David C. Barker, Utica, all of Mich.

[73] Assignee: Automotive Products plc, Great Britain

[21] Appl. No.: 3,247

[22] Filed: Jan. 14, 1987

[51] Int. Cl.$^4$ .............................................. H01H 3/14
[52] U.S. Cl. .................................... 200/61.89; 340/71
[58] Field of Search ...................... 340/71, 52 R, 52 F, 340/53; 200/61.89

[56] References Cited

U.S. PATENT DOCUMENTS 2,276,028 3/1942 Dick ................................. 200/61.89

Primary Examiner—A. D. Pellinen
Assistant Examiner—Morris Ginsburg
Attorney, Agent, or Firm—Krass & Young

[57] ABSTRACT

A master cylinder assembly including a primary housing defining an elongated bore, a piston slidably mounted in the bore, a piston rod pivotally connected at its forward end to the piston, a switch housing slidably and rotatably mounted on the piston rod rearwardly of the primary housing, spring means biasing the switch housing for forward sliding movement on the piston rod into engagement with the rear end of the primary housing, and switching means within the switch housing actuated in response to sliding movement of the piston rod relative to the switch housing. A retainer clip is secured to the rear end of the primary housing in a fixed predetermined angular position and includes a finger portion extending rearwardly for coaction with a pin member rigidly projecting from the switch housing. The clip and pin member coact to maintain the switch in a predetermined fixed angular position relative to the remainder of the assembly to facilitate the installation of the assembly into a motor vehicle.

12 Claims, 1 Drawing Sheet

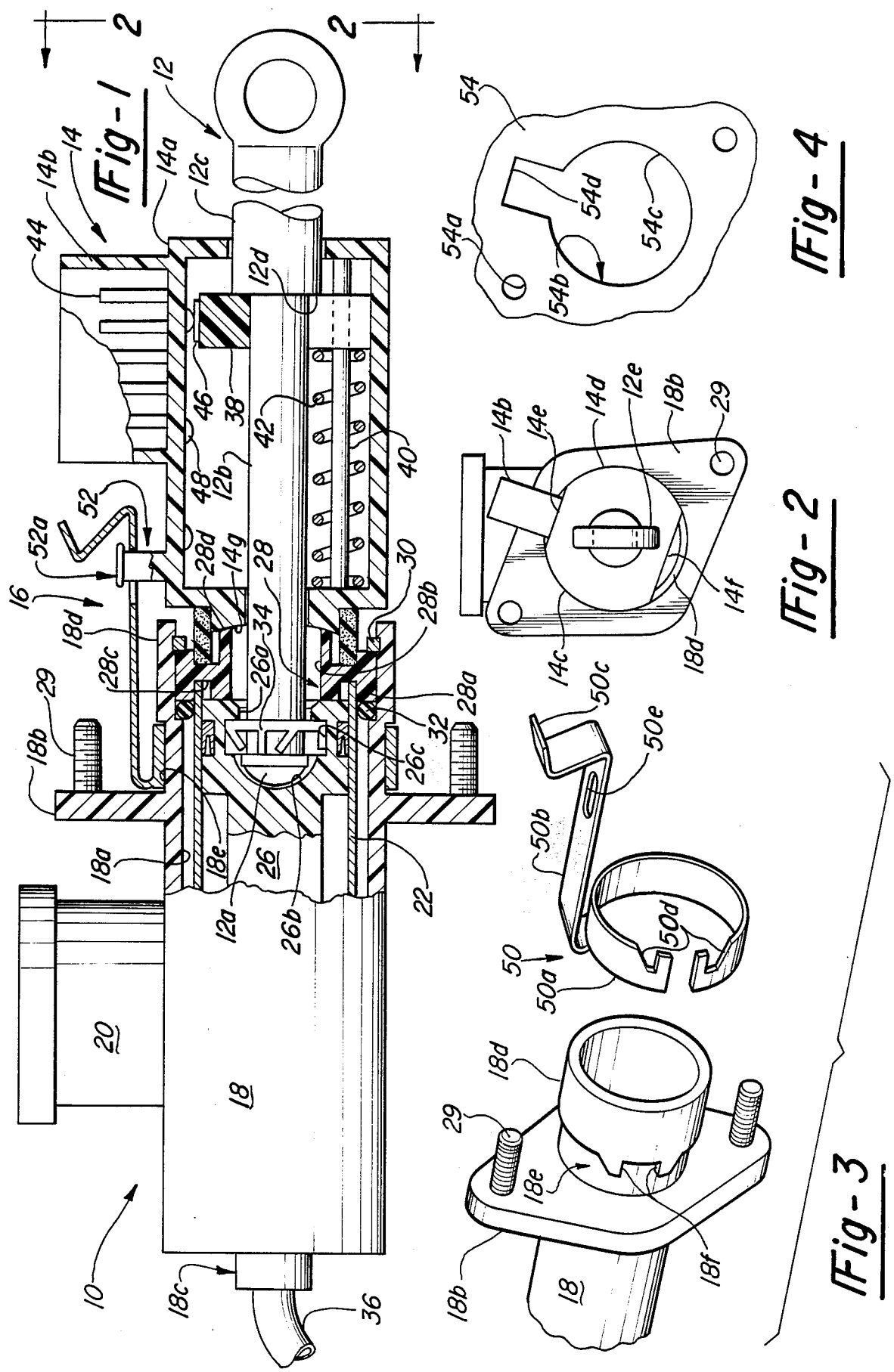

RETAINING DEVICE FOR HYDRAULIC MASTER CYLINDER SWITCH

INTRODUCTION

This invention relates to an electrical switch operated by the input member of an hydraulic master cylinder, such as the master cylinder of a motor vehicle clutch hydraulic control system, the master cylinder of a motor vehicle hydraulic brake system, and the like.

BACKGROUND OF THE INVENTION

An electrical switch is often associated with the master cylinder of motor vehicle hydraulic brake systems for the purpose of, for example, energizing a stop light circuit and/or deenergizing a cruise control circuit upon application of the brakes by the driver. Such electrical switches are generally of the pressure operated type. That is, they are operated by the increase of hydraulic fluid pressure when the brake pedal is displaced such as to cause a corresponding displacement of the master cylinder piston, thus increasing the pressure of the hydraulic fluid in the master cylinder in front of the piston. Pressure operated switches are costly to manufacture and they must be installed, at least partly, within the master cylinder. They are also often unreliable as they must be activated by a slight increase in the hydraulic fluid pressure for providing an appropriate stop signal even upon slight application of the brakes or for disconnecting the cruise control system as the result of a slight foot tap on the brake pedal. Further, the functioning of pressure operated switches may be somewhat erratic under certain conditions, such as in the presence of hydraulic fluid back pressure surges in the master cylinder caused, for example, by heat expansion of the brake linings and of the hydraulic fluid. Such erratic functioning of pressure operated switches causes erratic turning on and off of the motor vehicle stop signal lights, particularly irritating to the driver of a motor vehicle immediately following.

Hydraulic control apparatus for motor vehicle mechanical clutches are readily becoming the standard of the industry for operating the clutch release mechanism of a motor vehicle provided with a mechanical clutch and the conventionally manually shiftable transmission or gearbox. Examples of such hydraulic control systems for mechanical clutches are disclosed in U.S. Pat. Nos. 4,407,125, 4,585,108, 4,585,109, 4,585,106, 4,585,107, and 4,599,860, and in U.S. Pat. Nos. 4,684,003 and 4,624,290 and in co-pending application Ser. No. 555,666, all assigned to the same assignee as the present application.

It has become general practice in the automobile industry to interlock the operation of the engine starter motor with other controls of the motor vehicle such that the starter motor is rendered inoperative unless the transmission is in neutral or park in motor vehicles provided with an automatic transmission or, in motor vehicles provided with a foot operated clutch and a manually operated gearshift transmission, unless the transmission is in neutral and/or the clutch pedal is fully depressed to fully release the clutch. In addition, it is convenient, in motor vehicles provided with a cruise control and a mechanical clutch, to shut off the operation of the cruise control upon, for example, downshifting which in turn requires release of the clutch. However, it is desirable that the cruise control be disconnected even before the clutch is fully released to enable the driver to cut off the cruise control by a slight foot tap on the clutch pedal, and perhaps to discourage "riding" on the clutch, that is, resting one's foot on the clutch pedal at all times.

In prior applications Ser. Nos. 080,196 and 878,121, there are disclosed mechanically operated limit switches, mounted on the input member of a hydraulic control system, such as a clutch hydraulic control or a brake hydraulic control, which are directly operated by the master cylinder input member. Whereas these mechanically operated switches avoid the recited problems with the prior art pressure operated switches and are generally satisfactory, they tend to complicate the assembly process of the associated hydraulic control system by virtue of their disposition on the input member of the master cylinder.

SUMMARY OF THE INVENTION

The present invention is directed to an improvement of the limit switches disclosed in application Ser. Nos. 080,196 and 878,121 and, in particular, to a mechanically actuated limit switch in which retainer and locator means are provided to facilitate the rapid and proper installation of the master cylinder and switch assembly in a motor vehicle.

The master cylinder and switch assembly of the invention is of the type including a primary housing defining an elongated bore; a piston slidably mounted in the bore; an elongated piston rod pivotally connected at its forward end to the piston; a switch housing slidably and rotatably mounted on the piston rod rearwardly of the primary housing; spring means biasing the switch housing for forward sliding movement on the piston rod toward the rear end of the primary housing; and switch means within the switch housing actuated in response to sliding movement of the piston rod relative to the switch housing. According to the improvement of the present invention, coacting means are provided on the primary housing and on the switch housing which are operative to generally preclude angular movement of the switch housing about the lengthwise axis of the piston rod. This arrangement greatly facilitates the installation of the master cylinder and switch assembly in a motor vehicle by ensuring that the switch housing is maintained in its proper angular orientation relative to the remainder of the assembly during the installation process.

According to a further feature of the invention, the coacting means comprises a clip adapted to be secured to the rear end of the primary housing at a fixed predetermined angular position relative thereto and including an aperture; and a pin member rigidly projecting from the switch housing for coaction with the aperture in the clip. This arrangement provides an inexpensive and effective means for simply and effectively controlling the angular position of the switch during the assembly process.

According to a further feature of the invention, the clip includes a main body split ring portion adapted to encircle a portion of the rear end of the primary housing and a finger portion extending rearwardly from the split ring portion and defining the aperture for receipt of the pin member. This arrangement provides a convenient and inexpensive means for capturing the pin member and thereby controlling the angular position of the switch housing.

According to a further feature of the invention, the main body split ring portion includes locator means coacting with locator means on the rear end of the primary housing to position and maintain the clip in the desired predetermined angular position relative to the primary housing. This arrangement ensures that the clip will be properly installed so as to properly position the switch housing relative to the remainder of the assembly.

According to a further feature of the invention, the clip member is formed of resilient material so that the finger portion may flex in cantilever fashion about its juncture with the main body split ring portion, and the finger portion includes a handle portion at its rearward end to facilitate flexing movement of the finger portion to release the pin member from the aperture. This arrangement allows the pin member to coact with the finger portion to normally preclude rotation of the switch housing about the lengthwise axis of the piston rod but allows the finger portion to be flexed in cantilever fashion and moved to a position where it may be disassociated from the pin member for disassembly purposes.

According to a further feature of the invention, the pivotal connection of the forward end of the piston rod to the piston comprises a generally spherical socket surface on the rearward end of the piston coacting with a generally spherical ball surface on the forward end of the piston rod; the forward end of the switch housing includes an annular generally spherical bearing surface generally centered on the pivot axis of the piston rod on the piston; and the spring means biases the annular spherical bearing surface on the switch housing into contact with a coacting annular spherical bearing surface on the rearward end of the primary housing. This arrangement allows the coacting spherical bearing surfaces on the forward end of the switch housing and the rearward end of the primary housing to coact to facilitate and guide the movement of the switch housing in response to pivotal movement of the piston rod relative to the piston occurring in response to actuation of the control pedal connected to the piston rod.

BRIEF DESCRIPTION OF THE DRAWINGS

FIG. 1 is a fragmentary cross-sectional view of an hydraulic master cylinder switch assembly embodying the invention;

FIG. 2 is an end view of the assembly of FIG. 1 looking in a direction of the arrow 2 in FIG. 1;

FIG. 3 is an exploded perspective view of a portion of the assembly of FIG. 1; and FIG. 4 is a fragmentary view of a vehicular bulkhead through which the hydraulic assembly is inserted during the assembly process.

DETAILED DESCRIPTION OF THE PREFERRED EMBODIMENT

The illustrated hydraulic assembly includes a master cylinder 10, a piston rod 12, a switch 14, and a locator assembly 16.

Master cylinder 10 includes a primary housing 18, a reservoir 20 attached or formed integrally with the upper side of housing 18 and communicating in known manner at its lower end with the interior of housing 18, a liner 22, a piston 26, and a retainer 28.

Housing 18 is formed of a suitable plastic material and includes a central bore 18a, a flange 18b carrying mounting studs 29, an outlet fitting 18c, and a radially enlarged rear end portion 18d defining a circumferential groove 18e between the forward end of portion 18d and flange portion 18b.

Liner 22 is formed of a suitable metallic material and is fitted concentrically within bore 18a.

Retainer 28 is formed of a suitable plastic material and has a generally annular configuration. Retainer 28 is fitted in the enlarged rear end portion 18d of housing 18 and is precluded from rearward movement relative to the housing by a retainer ring 30. Retainer 28 includes an outer rim portion 28a, a central hub portion 28b, and a forwardly facing annular groove 28c. Liner 22 is received at its rearward end in annular groove 28c and an O-ring 32 is positioned between the forward edge of retainer rim portion 28a and a confronting shoulder defined on the interior periphery of housing 18.

Piston 26 is formed of a suitable metallic material and is slidably positioned within liner 22. A spring, not shown, maintains the rear end of piston 26 against the forward annular end of retainer hub portion 28b in the rest position of the hydraulic assembly. A bore 26a is provided in the rear end of piston 26 and a spherical surface 26b is defined at the blind or bottom end of bore 26a.

Piston rod 12 is formed of a suitable metallic material and includes a spherical head portion 12a coacting with spherical piston surface 26b, a relatively small diameter forward end portion 12b extending rearwardly from spherical head 12a, a relatively large diameter rearward end portion 12c forming a shoulder 12d at its juncture with forward end portion 12b, and a clevis portion 12e at the forward end of the rod. Rod spherical head 12a is maintained in engagement with spherical piston surface 26b by a spring clip 34 received in a counterbore 26c at the rear end of the piston.

It will be understood that clevis 12e will typically be pivotally connected to a brake pedal or clutch pedal of the associated vehicle and that actuation of the associated pedal will move piston rod 12 forwardly or to the left as viewed in FIG. 1 to move piston 26 forwardly and eject fluid under pressure from the master cylinder through outlet 18c for delivery through a conduit 36 to a slave cylinder. Since the associated clutch or brake pedal is pivotally mounted on the vehicle, piston rod 12 undergoes pivotal movement relative to piston 26 as the master cylinder is actuated and this pivotal movement is accommodated by swiveling coaction between spherical piston rod head 12a and spherical socket surface 26b on the piston.

Switch 14 is slidably and rotatably mounted on piston rod 12 and includes a hollow main body housing portion 14a, an upstanding contact housing portion 14b, a switching member 38, a pair of guide rods 40, and a pair of coil springs 42. Housing portions 14a and 14b and switching member 38 are preferably formed of plastic and guide rods 40 and springs 42 are preferably formed of metal.

Main body housing portion 14a includes arcuate side portions 14c and 14d centered on the central axis of the piston rod and having an effective diameter essentially corresponding to the diameter of housing end portion 18d, and upper and lower flat or chordal sides 14e and 14f.

Contact housing portion 14b is formed integrally with the upper side 14e of main body housing portion 14a, is hollow, and opens upwardly. A plurality of metal contact fingers 44 are upwardly positioned within housing 14b. Switching member 38 is generally horseshoe shaped and slidably straddles reduced diameter forward end portion 12b of piston rod 12. A guide rod 40 extends through each leg of switching member 38 and a coil spring 42 is positioned concentrically around and coacts with each guide rod 40 to urge switching member 38 rearwardly within housing 14a against piston rod shoulder 12d.

Spring members 42 are compressed within housing 14a so that they act to constantly bias the switch housing for forward sliding movement on the piston rod against the rear annular edge 28d of the retainer 28. Rear annular edge 28a is formed as a spherical annular surface centered on the pivot axis of piston head 12a on spherical surface 26b, and a coacting spherical annular surface 14g, also centered on the pivot axis between the piston rod and the piston, is formed at the forward end of main body switch housing 14a for coaction with spherical annular surface 28d.

Switching member 38 includes a metal contact 46 on its upper end for sliding coaction with a plurality of axially spaced contacts 48 on the interior upper periphery of main body switch housing 14a to selectively make and break various vehicular control circuits in response to relative sliding movement between piston rod 12 and switch housing 14a. The manner in which contact 46 coacts with contacts 48 and with contact fingers 44 to selectively make and break various circuits associated with the motor vehicle is more fully described in applicant's copending U.S. patent applications Ser. Nos. 080,196 and 878,121.

Retaining means 16 includes a spring clip 50 and a pin member 52 formed integrally with the upper face 14e of main body switch housing portion 14a.

Clip 50 is formed of a suitable spring steel material and includes a main body split ring portion 50a, a finger portion 50b, and a handle portion 50c. Main body split ring portion 50a is adapted to pass over housing end portion 18d and seat snappingly in annular groove 18e. Locator notches 50d at the opposite ends of main body portion 50a coact with locator lug portions 18f formed on housing 18 proximate groove 18e to positively locate the spring clip 50 in a predetermined fixed angular position relative to housing 18 so as to position finger portion 50b in a predetermined fixed angular position relative to housing 18. Finger portion 50b extends rearwardly from main body split ring portion 50a in cantilever fashion and defines an aperture or slot 50e for receipt of pin member 52. Handle portion 50c extends upwardly from the free or rear end of finger portion 50b and is adapted to be grasped to flex finger portion 50b about its juncture with main body split ring portion 50a.

Pin member 52 is adapted to pass upwardly through aperture 50e and includes a head portion 52a to preclude inadvertent dislodgement of the pin member 52 from aperture 50e. As seen in FIG. 1, pin member 52 normally functions to allow piston rod 12 and switch 14 to pivot with respect to the master cylinder housing without displacing the pin member from the aperture and, in this regard, pin member 52 is positioned rearwardly in aperture 50e with head portion 52a extending rearwardly over the adjacent portion of the finger portion 50b to discourage inadvertent dislodgement of the pin member from the aperture 50e. When it is desired to separate pin member 52 from retainer clip 50, piston rod 12 and switch 14 may be rotated upwardly as viewed in FIG. 1 and the handle portion 50c of the retainer clip grasped to flex finger portion 50b upwardly to clear head 52a of pin member 52 and allow disassembly of the various components of the assembly.

The angular location of retainer clip finger portion 50b relative to the central axis of the assembly determines the angular position in which switch 14 is held on the piston rod 12. The particular angular disposition in which the switch is held on the piston rod will be determined by the particulars of the specific installation in the associated motor vehicle. For example, it is normally desirable to orient the switch 14 in such a way as to position the contact housing 14b generally upwardly to facilitate insertion of a contact room into the open upper end of the contact housing. It is necessary, however, to access studs 29 with nut drivers so as to securely and rapidly mount the master cylinder assembly to the appropriate bulkhead on the vehicle. As seen in FIG. 4, the bulkhead 54 is provided with holes 54a for passage of studs 29 and with a central key shaped aperture 54b for passage of the switch housing 14 and the rear end of the master cylinder housing 18. It will be understood that as the assembly is passed through opening 54b in bulkhead 54, switch main body housing portion 14a and master cylinder housing portion 18d pass through the circular central portion 54c of the opening while switch contact housing portion 14b and clip portions 50b and 50c pass through the key portion 54d of the opening. In the installation situation shown in FIGS. 2 and 4, the retainer 50 is arranged in such a way as to retain and position upstanding contact housing portion 14b at approximately a 2 o'clock position to correspond to the corresponding 2 o'clock orientation of the key portion 54d of opening 54b in the bulkhead.

The invention retainer device functions to properly orient switch housing 14 relative to the piston rod during the assembly of the master cylinder assembly to the vehicle so as to allow ready passage of studs 29 through bulkhead holes 54a and simultaneous passage of contact housing portion 14b through keyhole portion 54d of the bulkhead opening, and the invention retainer device thereafter functions to maintain the switch housing in the proper angular orientation relative to the piston rod to facilitate installation of the associated loom into the open end of contact housing portion 14b.

The invention retainer device will be seen to provide an inexpensive and efficient means for properly orienting a switch on a master cylinder assembly during the assembly process so as to facilitate the assembly process both in terms of facilitating passage of the assembly through the associated vehicular bulkhead and in terms of thereafter maintaining the switch in a proper angular position to receive the associated loom.

Whereas a preferred embodiment of the invention has been illustrated and described in detail, it will be apparent that various changes may be made in the disclosed embodiment without departing from the scope or spirit of the invention.

I claim:

1. A master cylinder assembly comprising:
(A) a primary housing defining an elongated bore having a forward end and a rearward end, and including an outlet port adjacent said forward end of said bore;
(B) a piston slidably mounted in said bore and operative in response to movement of said piston in said bore toward said forward end thereof to eject fluid under pressure from said forward end of said bore through said outlet port;
(c) an elongated piston rod pivotally connected at the forward end thereof to the rearward end of said piston within said bore and projecting out of said rearward end of said bore at the rear end of said primary housing;

(D) a rigid switch housing slidably and rotatably mounted on said piston rod rearwardly of said primary housing;

(E) spring means biasing said switch housing for forward sliding movement on said piston rod toward the rear end of said primary housing;

(F) switching means within said switch housing actuated in response to sliding movement of said piston rod relative to said switch housing; and (G) coacting means on said primary housing and on said switch housing operative to angularly locate said switch housing in a predetermined. position of rotation about a lengthwise axis of said piston rod.

2. A master cylinder assembly according to claim 1 wherein said coacting means comprises:

(H) a clip defining an aperture; and (I) a pin member adapted to be received in said aperture.

3. A master cylinder assembly according to claim 2 wherein:

(J) said clip is adapted to be secured to the rear end of said primary housing in a fixed predetermined angular position relative thereto; and (K) said pin member rigidly projects from said switch housing for coaction with said aperture.

4. A master cylinder assembly according to claim 3 wherein:

(L) said clip includes a main body split ring portion adapted to encircle a portion of said rear end of said primary housing and a finger portion extending rearwardly from said split ring portion and defining said aperture.

5. A master cylinder assembly according to claim 4 wherein:

(M) said main body split ring portion includes locator means coacting with locator means on said rear end of said primary housing to position and maintain said clip in said fixed predetermined angular position relative to said primary housing.

6. A master cylinder assembly according to claim 5 wherein:

(N) said clip is positioned on said primary housing with said finger portion positioned generally upwardly and extending rearwardly above said switch housing; and (O) said pin member extends rigidly upwardly from said switch housing for passage through said aperture.

7. A master cylinder assembly according to claim 6 wherein:

(P) said pin member includes a head portion coacting with said aperture to maintain said pin member within said aperture irrespective of pivotal movement of said switch housing with said piston rod relative to said primary housing.

8. A master cylinder assembly according to claim 7 wherein:

(Q) said clip is formed of a resilient material so that said finger portion may flex in cantilever fashion about its juncture with said main body split ring portion; and (R) said finger portion includes a handle portion at its rearward end to facilitate flexing movement thereof to release said pin member from said aperture for disassembly purposes.

9. A master cylinder assembly according to claim 1 wherein:

(H) the pivotal connection of the forward end of said piston rod to said piston comprises a generally spherical socket surface on said rearward end of said piston coacting with a generally spherical ball surface on the forward end of said piston rod to define a pivot axis;

(I) A forward end of said switch housing includes an annular generally spherical bearing surface generally centered on said pivot axis; and (J) said spring means biases said bearing surface into engagement with a coacting annular bearing surface on the rearward end of said primary housing.

10. In a master cylinder assembly of the type including a master cylinder housing having a piston and a piston rod, a switch housing slidably and rotatably mounted on the piston rod, and switching means within said switch housing operative in response to relative sliding movement between the piston rod and the switch housing to initiate switching operations, the improvement wherein:

(A) a releasable snap on clip is positioned on one of said housings; and (B) a pin is provided on the other of said housings for coaction with said clip to angularly locate said switch housing in a predetermined position of rotation about a lengthwise axis of said piston rod.

11. A master cylinder assembly according to claim 10 wherein:

(C) said clip is adapted to be secured to said master cylinder housing in a fixed predetermined angular position relative thereto and includes an aperture; and (D) said pin rigidly projects from said switch housing for coaction with said aperture.

12. A master cylinder assembly according to claim 11 wherein:

(E) said switch housing is positioned rearwardly of said master cylinder housing; and (F) said clip includes a main body split ring portion adapted to encircle a rear end portion of said master cylinder housing and a finger portion extending rearwardly from said split ring portion and defining said aperture.

* * * * *